United States Patent

[11] 3,567,931

| [72] | Inventor | Herman H. Eelkema<br>2121 Iglehart Ave, St. Paul, Minn. 55104 |
|---|---|---|
| [21] | Appl. No. | 865,455 |
| [22] | Filed | Oct. 10, 1969 |
| [45] | Patented | Mar. 2, 1971 |

[54] RADIOGRAPHIC FILM TRANSPORT WITH FILM CONVEYOR BELTS WHICH FUNCTION AS INTENSIFYING SCREENS
4 Claims, 6 Drawing Figs.

| [52] | U.S. Cl. | 250/66, 250/49.5, 250/57 |
|---|---|---|
| [51] | Int. Cl. | G03b 41/16 |
| [50] | Field of Search | 250/53, 66, 49.5 (E) |

[56] References Cited
FOREIGN PATENTS
1,140,064  11/1962  Germany.................... 250/66

*Primary Examiner*—James W. Lawrence
*Assistant Examiner*—C. E. Church
*Attorney*—Merchant & Gould ABSTRACT: Two continuous flexible sheets of material opaque to light but transparent to X-rays, each having on one side thereof a coating of crystaline material which emits light upon the impinging thereon of X-rays, the continuous sheets being mounted for continuous rotation with portions of each sheet being parallel and the coated surfaces of said portions being in juxtaposition, a strip of film having emulsion on at least one side thereof positioned between the juxtaposed portions of the sheets and means for simultaneously advancing each of the sheets and the film equal distances.

PATENTED MAR 2 1971 3,567,931
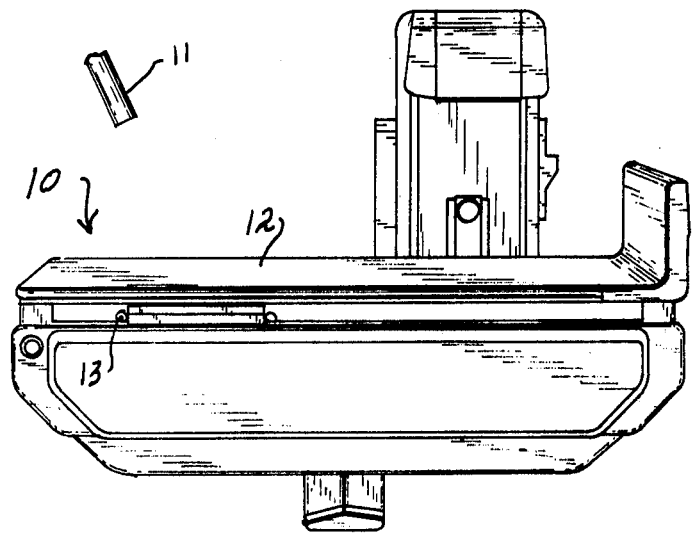
Fig_1
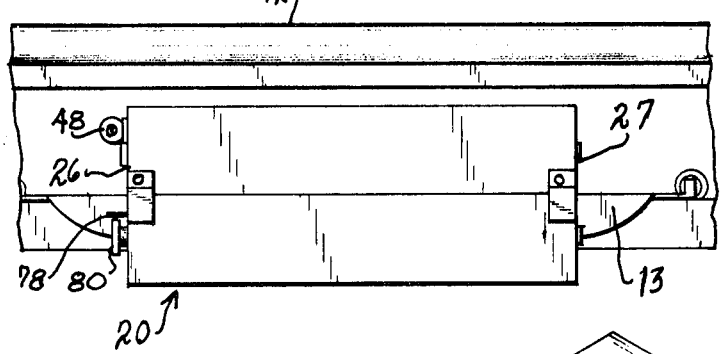
Fig_2
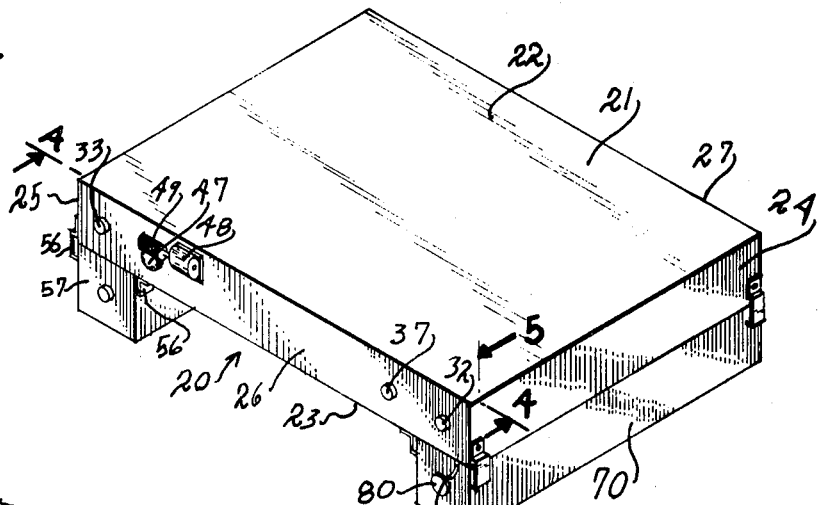
Fig_3
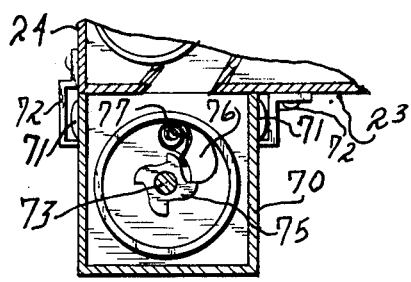
Fig_5
INVENTOR.
HERMAN H. EELKEMA
BY
Merchant & Gould
ATTORNEYS

PATENTED MAR 2 1971

INVENTOR.
HERMAN H. EELKEMA
BY
Merchant & Gould
ATTORNEYS 3,567,931

RADIOGRAPHIC FILM TRANSPORT WITH FILM CONVEYOR BELTS WHICH FUNCTION AS INTENSIFYING SCREENS

BACKGROUND OF THE INVENTION

1. Field of the Invention

In radiography it is often necessary to take radiographs of relatively thick portions of a body, so that X-rays are sufficiently diminished and diffused to produce a poor radiograph. In these instances it is presently the practice to utilize intensifying screens. These intensifying screens are formed from material which is sensitive to X-rays and emits light to aid in exposing the X-ray film. To insure that the light emitted by the intensifying screens does not diffuse and produce a blurry radiograph, the intensifying screen and the X-ray film are maintained in parallel, tight juxtaposition.

2. Description of the Prior Art

In the prior art a single stationary intensifying screen is utilized and cassettes or rolls of film are used in cooperation therewith. The cassettes or rolls of film are normally positioned with a slight spacing between the emulsion thereon and the intensifying screen, so that the film can be readily moved relative to the intensifying screen, for example inserting and removing the film from the X-ray machine. This prior art apparatus requires some complicated structure, such as a machine for producing a vacuum between the intensifying screen and the film, capable of biasing the film into tight juxtaposition with the intensifying screen. Because of the need to separate the film and the intensifying screen during movement of the film and the need to bias them together during operation, the prior art machines are extremely complicated, cumbersome and expensive.

SUMMARY OF THE INVENTION

The present invention pertains to continuous intensifying screen apparatus for use with X-ray equipment including a continuous sheet of flexible material having a coating on one side thereof of crystaline material which emits electromagnetic radiations upon X-rays being impinged thereon and means for mounting said continuous sheet so that a portion of the coated side is parallel with and in juxtaposition to the emulsion on a strip of film with means for advancing the film and the continuous sheet of material substantially equal amounts simultaneously.

It is an object of the present invention to provide new and improved continuous intensifying screen apparatus.

It is a further object of the present invention to provide a continuous intensifying screen adapted to have a roll of film mounted in juxtaposition thereto and advanced simultaneously therewith during operation.

It is a further object of the present invention to provide continuous intensifying screen apparatus which is relatively simple and inexpensive to manufacture and which may be utilized in conjunction with presently operating X-ray equipment.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGS.:

FIG. 1 is a view in front elevation of an X-ray machine having the present apparatus mounted thereon, portions thereof removed;

FIG. 2 is an enlarged detailed view of the present apparatus as seen in FIG. 1;

FIG. 3 is a view in perspective of the present apparatus;

FIG. 5 is an enlarged sectional view as seen from the line 5—5 in FIG. 3, portions thereof removed.

DESCRIPTION OF THE PREFERRED EMBODIMENT

Figure 4:
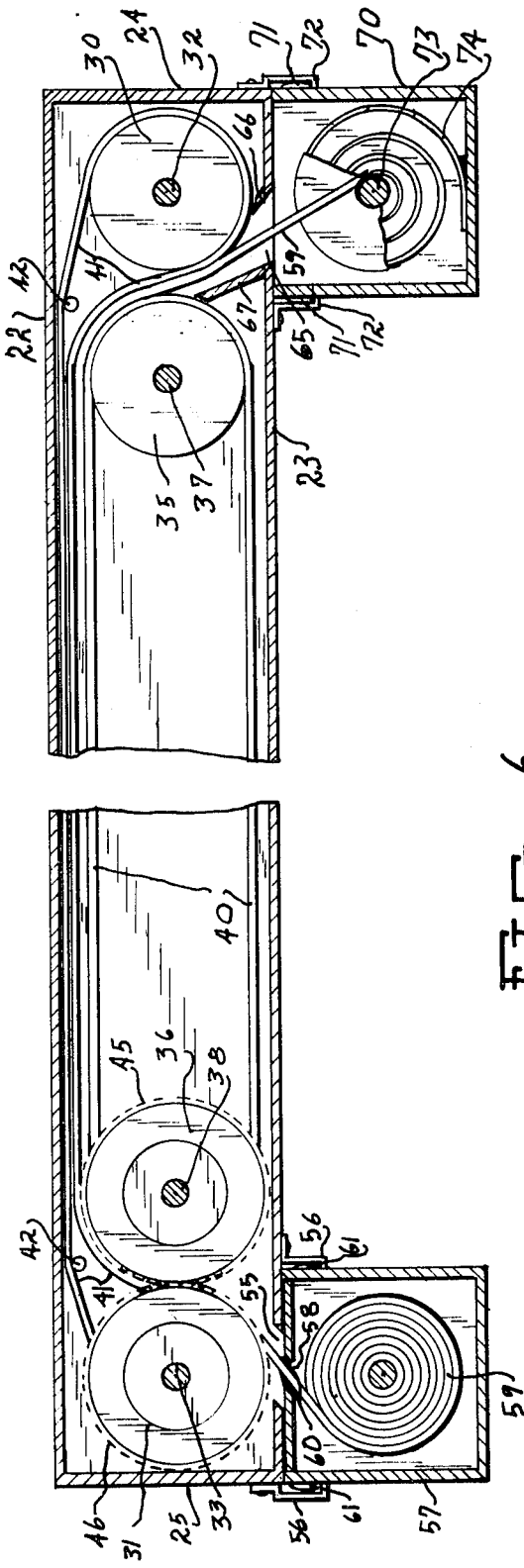
FIG. 4 is an enlarged sectional view as seen from the line 4—4 in FIG. 3, portions thereof removed.

Referring to the drawings the numeral 10 generally designates a diagnostic X-ray table with an X-ray tube 11 illustrated diagrammatically. The X-ray table 10 includes a top 12 designed to receive a patient thereon with a movable bucky slot 13 immediately therebelow. As is well known in the art, the bucky slot 13 is designed to receive cassettes or other types of film and X-ray grids (reciprocating or stationary). It should be understood that a commercially available X-ray table 10, including the bucky slot 13, is illustrated and the present embodiment of the intensifying screen apparatus is designed to cooperate therewith, however, if the diagnostic X-ray table is constructed with the present intensifying screen apparatus as a portion thereof (rather than modifying existing equipment) the apparatus may be modified or altered substantially.

The present continuous intensifying screen apparatus is generally designated 20 and is designed to fit within the bucky slot 13 of any commercially available diagnostic X-ray tables, as illustrated in FIGS. 1 and 2. The apparatus 20 includes a generally boxlike housing 21 having top and bottom walls 22 and 23, end walls 24 and 25 and side walls 26 and 27. The thickness of the housing 21, that is the width of the end walls 24 and 25 and the side walls 26 and 27, is such as to allow the housing 21 to be placed in the bucky slot 13 with little or no difficulty. The length of the housing 21, that is the length of the side walls 26 and 27 and the top and bottom walls 22 and 23, is sufficiently long to allow portions of the housing 21 adjacent each end wall 24 and 25 to extend outwardly from the bucky slot 13, as will become apparent presently. The housing 21 should be constructed of any convenient rigid material which is opaque to light but is substantially transparent to X-rays.

A first pair of rollers 30 and 31 are rotatably mounted within the housing 21 by means of axles 32 and 33, respectively. Axles 32 and 33 are mounted between the side walls 26 and 27, parallel with the end walls 24 and 25, and are spaced from the end walls 24 and 25, respectively, so as to allow the rollers 30 and 31 to rotate freely. A second pair of rollers 35 and 36 are rotatably mounted by means of axles 37 and 38, respectively. Axles 37 and 38 are rotatably mounted between the side walls 26 and 27 of the housing 21, parallel with the end walls 24 and 25 and spaced apart between the rollers 30 and 31 so that the roller 35 is adjacent the roller 30 and the roller 36 is adjacent the roller 31. The diameters of the rollers 30, 31, 35 and 36 are all approximately equal and, in this embodiment, the axles 32, 33, 37 and 38 all lie substantially in a horizontal plane. It should be understood that many embodiments of the continuous intensifying screen apparatus might be devised by those skilled in the art, but the present embodiment is illustrated for exemplary purposes and because of its simplicity of operation and construction.

A continuous sheet of flexible material or continuous belt 40 is tautly engaged around the pair of rollers 35 and 36 for rotation therewith. A second continuous sheet of flexible material or continuous belt 41 is engaged around the pair of rollers 30 and 31 with the central flights thereof extending over the rollers 35 and 36. Two circular pins 42 are affixed to the side walls 25 and 26 of the housing 21 adjacent each extremity of the upper flight of the belt 41 so as to maintain the upper flight of the belt 41 spaced slightly from the lower flight thereof. Thus, the upper flight of the belt 41 is parallel with and adjacent the top wall 22 of the housing 21, the lower flight of the belt 41 is parallel with and spaced slightly therebelow, and the upper flight of the belt 40 is in underlying engagement with the lower flight of the belt 41 along substantially the entire length thereof.

The outwardly directed surfaces of the belts 40 and 41 each have a coating of material thereon which emits electromagnetic radiations, such as light, upon the impinging thereon of X-rays. Examples of some material which provides this phenomenon are calcium tungstate and related materials, barium tungstate and related materials, etc., but any material which upon being struck with X-rays will emit electromagnetic radiations capable of exposing, or acting upon, photographic film may be utilized. It should be understood that these materials are generally provided in a crystaline powdered form and will be referred to as crystals of material, although all material which may operate to produce desirable electromagnetic radiations may not be in the crystaline form. Further, it should be understood that the crystals of material are affixed to the surfaces of the belts 40 and 41 in any of the variety of methods well known to those skilled in the art. In general the material making up the belts 40 and 41 and the crystaline material thereon are chosen so that the belts are opaque to the electromagnetic radiations given off by the crystaline material but the belts 40 and 41 are substantially transparent to X-rays, i.e., X-rays pass readily through the belts 40 and 41 but the electromagnetic radiations from the crystaline material does not.

Figure 6:
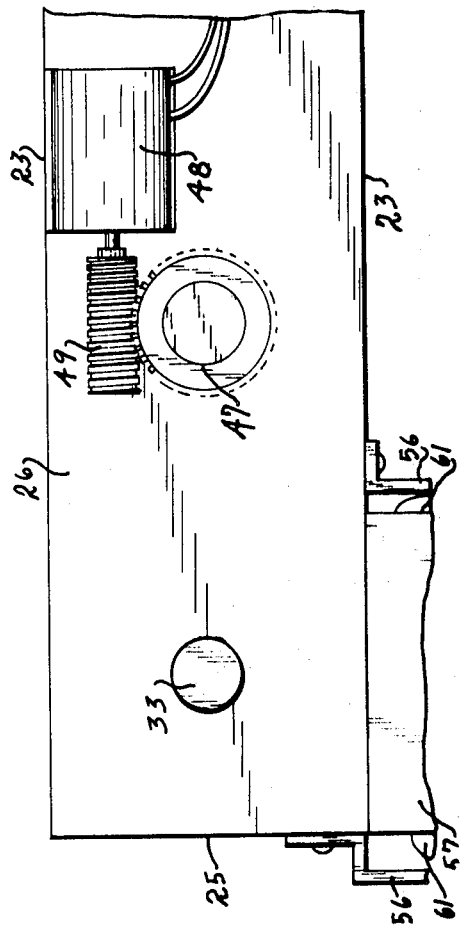
FIG. 6 is an enlarged view illustrating a portion of the apparatus of FIG. 3 in side elevation, portions thereof broken away.

The roller 36 has a gear 45 affixed thereto for rotation therewith. The roller 31 has a gear 46 affixed thereto for rotation therewith. The gears 45 and 46 are substantially similar in diameter and number of teeth so that movement of one of the rollers 31 or 36 causes simultaneous and equal amounts of movement of the other roller 31 or 36. Referring to FIGS. 3 and 6, it can be seen that the axle 38 extends outwardly through the side wall 26 and a gear 47 is affixed thereto external of the housing 21. A motor 48 having a worm gear 49 affixed to the shaft thereof is mounted so that the worm gear 49 meshes with the gear 47 and produces rotation of the rollers 31 and 36 upon rotation of the motor 48. It should be understood that many other types of devices might be provided for rotating the rollers 31 and 36, such as hand cranks or the like, and the present motor 48 and gear chain are illustrated because of their convenience. While the motor 48 might be a reversible motor if desired, to rewind film, as will become apparent presently, the motor 48 normally runs in a direction to cause the lower flight of the belt 41 and the upper flight of the belt 40 to move from left to right in FIG. 4.

A film inlet opening 55 is provided in the bottom wall 23 of the housing 21 adjacent the end wall 25. The film inlet opening 55 consists of an elongated slot parallel with and generally below the juncture of the rollers 31 and 36. Two pairs of spaced apart spring clips 56 are provided on each side of the film inlet opening 55, which spring clips 56 are adapted to receive therein an elongated film cartridge 57. The film cartridge 57 is an elongated boxlike structure having a generally square cross section in this embodiment and an elongated opening 58 on one side thereof. Film 59 is rolled on a spindle within the film cartridge 57 and an elongated lead at the forward end of the film 59 extends outwardly through the opening 58 in the usual manner. In this embodiment the film 59 has an emulsion on both sides thereof, however, film having emulsion on only one side might be utilized if desired. The opening 58 has a light block 60 therein to prevent light from entering the film cartridge 57 during handling. The film cartridge 57 has outwardly extending ears 61 adjacent the side having the opening 58 therein, which ears 61 mate with the spring clips 56 to hold the film cartridge 57 into tight abutting engagement with the bottom wall 23 and with the opening 58 coinciding with the film inlet opening 55.

A film outlet opening 65, somewhat similar to the film inlet opening 55 is formed in the bottom wall 23 of the housing 21 adjacent the end wall 24. The film outlet opening 65 is positioned parallel with and generally below the juncture of the rollers 30 and 35 and inwardly directed flanges 66 and 67 are formed along each edge thereof, which flanges 66 and 67 extend inwardly to adjacent the outer diameter of the rollers 30 and 35, respectively, to act as film directing walls and light blocks. In the present embodiment the housing 21 is constructed so that, with the film cartridge 57 in position, substantially no light can enter and the entire apparatus can be loaded with photographic film even in a lighted room. It should be understood that the device might be constructed in a somewhat simpler fashion if the apparatus were loaded with film only in a darkened room.

A film receiving cartridge 70, constructed somewhat similar to the film cartridge 57 except that one side thereof is removed to form a film receiving opening, has ears 71 adjacent the film receiving opening adapted to engage spring clips 72 and maintain the film receiving cartridge 70 in tight abutting engagement with the bottom wall 23 over the film outlet opening 65. The film receiving cartridge 70 contains a spindle 73 adapted to receive film thereon rotatably mounted therein. A torsion spring 74 is affixed between the spindle 73 and the film receiving cartridge 70 so as to produce a bias on the spindle 73, upon being properly wound in advance, tending to roll the film 59 extending through the film outlet opening 65 onto the spindle 73. Referring to FIG. 5 a ratchet 75 affixed to the spindle 73 and a pall 76 pivotally affixed to the inner wall of the film receiving cartridge 70, cooperate to temporarily maintain the torsion spring 74 in a wound condition. A torsion spring 77 is affixed to the pall 76 and biases the pall 76 away from the ratchet 75. The pall 76 has an arm 78 affixed thereto which extends outwardly through a slot at one end of the film receiving cartridge 70 so that the pall 76 can be frictionally engaged with the ratchet 75 to temporarily prevent unwinding of the torsion spring 74. A knob 80 is affixed to the spindle 73 externally of the film receiving cartridge 70 to provide a means for winding the torsion spring 74. It should be understood that many other means might be utilized for winding the film as it egresses through the film outlet opening 65 and the present apparatus is illustrated because of its simplicity and dependability.

In the operation of the present continuous intensifying screen apparatus 20, the lead of the film 59 in the film cartridge 57 is inserted between the rollers 31 and 36 and the motor 48 is energized briefly. As the rollers 31 and 36 are rotated by the motor 48, the film 59 is drawn between the upper flight of the belt 40 and the lower flight of the belt 41 and sandwiches tightly therebetween.

In general the tension of the belts 40 and 41 will maintain the flights and the film 59 in sufficiently tight proximity for the correct operation of the intensifying screen. However, in some instances it may be desirable to add additional external bias to the flights, such as a continuous vacuum pressure source, or the like, to urge the flights of the belts 40 and 41 into tighter engagement with the film 59. As the rollers 31 and 36 continue to rotate the lead eventually egresses through the film outlet opening 65 at the other end of the housing 21. The housing 21 may then be positioned in the bucky slot 13 of the diagnostic X-ray table 10 and the lead is partially wound onto the spindle 73 in the film receiving cartridge 70, with the torsion spring 74 previously wound to the desired bias-producing position. With the lead of the film 59 partially wound on the spindle 73 the film receiving cartridge 70 is engaged in the spring clips 72 and the pall 76 is released from the ratchet 75.

X-rays from the tube 11 passing downwardly through the patient and the table top 12, pass through the top wall 22 of the housing 21 and the upper and lower flights of the belt 41. The crystals of material on the outwardly directed surfaces of the belts 40 and 41 are adjacent the film 59 and produce electromagnetic radiations or rays, which act upon the emulsion on the film 59 in the usual manner, when the crystals of material have the X-rays impinged thereon. Since the belts 40 and 41 are constructed of material which is opaque to the electromagnetic radiations but transparent to the X-rays, all of the electromagnetic radiations are directed to the film 59 and produce a clear, high quality picture or radiograph. Any electromagnetic radiations given off by the outwardly directed surface of the upper flight of the belt 41 are only directed upwardly because of the opaque quality of the belt 41 and such radiations are substantially absorbed by the inner surface of the housing 21.

While apparatus for use with a film having an emulsion on each side thereof is disclosed, it should be understood that film with a single emulsion might be utilized in conjunction with a single continuous belt having crystals of material coated on the outwardly directed surface thereof. Further, the present embodiment of the apparatus might be utilized for film having single or double emulsion if desired. Thus, continuous intensifying screen apparatus is disclosed which is extremely simple to operate and manufacture since the intensifying screen is always in tight abutting engagement with the surface of the film and does not need to be moved transversely therefrom each time the film is moved longitudinally to expose another portion thereof.

I claim:

1. Continuous intensifying screen apparatus for use with X-ray equipment comprising:
   a. crystals of material which emit electromagnetic radiations upon the impinging thereon of X-rays;
   b. a continuous sheet of flexible material substantially opaque to the electromagnetic radiations emitted by said crystals and substantially transparent to X-rays;
   c. said crystals being affixed to one continuous surface of said sheet of material in a substantially uniform coating;
   d. a housing adapted to be mounted in X-ray equipment;
   e. means mounting said continuous sheet of material in said housing for continuous rotation with a portion of said sheet lying in a plane generally transverse to the X-ray beam of the equipment and intersecting said beam;
   f. means for mounting an elongated strip of film, having an emulsion on at least one side thereof sensitive to the electromagnetic radiation emitted by said crystals and X-rays, parallel with said portion of said continuous sheet of material and with the one side having the emulsion thereon in juxtaposition to the side of said continuous sheet having said crystals affixed thereon; and
   g. means affixed to said housing for advancing the strip of film and the continuous sheet of material substantially equal amounts simultaneously.

2. Continuous intensifying screen apparatus as set forth in claim 1 wherein the housing is constructed to fit within the film slot of X-ray tables.

3. Continuous intensifying screen apparatus for use with X-ray equipment comprising:
   a. crystals of material which emit electromagnetic radiations upon the impinging thereon of X-rays;
   b. first and second continuous sheets of flexible material substantially opaque to the electromagnetic radiations emitted by said crystals and substantially transparent to X-rays;
   c. said crystals being affixed to one continuous surface of each of said sheets of material in substantially uniform coatings;
   d. a housing adapted to be mounted in X-ray equipment;
   e. means mounting said continuous sheets of material in said housing for continuous rotation with portions of said one continuous surface having said crystals affixed thereto of each of said sheets lying in parallel juxtaposition to each other and in a plane generally transverse to the X-ray beam of the equipment and intersecting said beam;
   f. means for mounting an elongated strip of film, having an emulsion on each side thereof sensitive to the electromagnetic radiation emitted by said crystals and X-rays, between said portions of said continuous sheets and parallel therewith; and
   g. means affixed to said housing for advancing the strip of film and the continuous sheets of material substantially equal amounts simultaneously.

4. Continuous intensifying screen apparatus as set forth in claim 3 wherein the means mounting the continuous sheets of material include two pairs of spaced apart generally parallel rollers.